(12) United States Patent
Sjöö

(10) Patent No.: US 8,038,370 B2
(45) Date of Patent: Oct. 18, 2011

(54) MILLING CUTTER TOOL FOR CHIP REMOVING MACHINING, AS WELL AS A CUTTING BODY THEREFOR

(75) Inventor: Sture Sjöö, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 262 days.

(21) Appl. No.: 12/331,018

(22) Filed: Dec. 9, 2008

(65) Prior Publication Data
US 2009/0162151 A1  Jun. 25, 2009

(30) Foreign Application Priority Data
Dec. 21, 2007 (SE) ........................................ 0702868

(51) Int. Cl.
*B26D 1/12* (2006.01)
*B23C 5/28* (2006.01)
(52) U.S. Cl. .......................................... 407/29; 407/103
(58) Field of Classification Search ............... 407/35, 407/36, 42, 24, 29, 113, 103, 102
See application file for complete search history.

(56) References Cited

U.S. PATENT DOCUMENTS

| | | | | |
|---|---|---|---|---|
| 3,574,911 A | * | 4/1971 | Penoyar | 407/114 |
| 4,936,719 A | * | 6/1990 | Peters | 407/42 |
| 5,059,070 A | * | 10/1991 | Baker | 407/114 |
| 5,112,162 A | * | 5/1992 | Hartford et al. | 407/49 |
| 5,924,825 A | * | 7/1999 | Schwab et al. | 407/42 |
| 6,499,917 B1 | * | 12/2002 | Parker et al. | 407/25 |
| 2008/0044239 A1 | * | 2/2008 | Sjoo et al. | 407/36 |
| 2009/0169312 A1 | * | 7/2009 | Sjoo | 407/35 |

FOREIGN PATENT DOCUMENTS

SE 526 644 10/2005

* cited by examiner

*Primary Examiner* — Will Fridie, Jr.
(74) *Attorney, Agent, or Firm* — Drinker Biddle & Reath LLP

(57) ABSTRACT

A milling cutter tool, including a basic body and a cutting body. The basic body includes an envelope surface and two opposite ends between which a geometrical center axis extends around which the basic body is rotated. The cutting body is fixed in a seating of the basic body and includes a pair of opposite main surfaces, a pair of opposite sides, and a pair of opposite end surfaces between which an imaginary, axial neutral plane extends situated halfway between the two main surfaces. The cutting body includes a set of chip removing teeth, which protrude from the envelope surface of the basic body, and are arranged in a row one after the other along at least one of the pair of opposite sides of the cutting body. Each one of the teeth includes a chip surface formed adjacent to a cutting edge from which the tooth extends between a pair of flanks along a length extension which is orientated at an angle ($\beta$) to the neutral plane. The angle ($\beta$) between the neutral plane of the cutting body and the length extension of each of the teeth is acute and amounts to at least 85°.

11 Claims, 6 Drawing Sheets

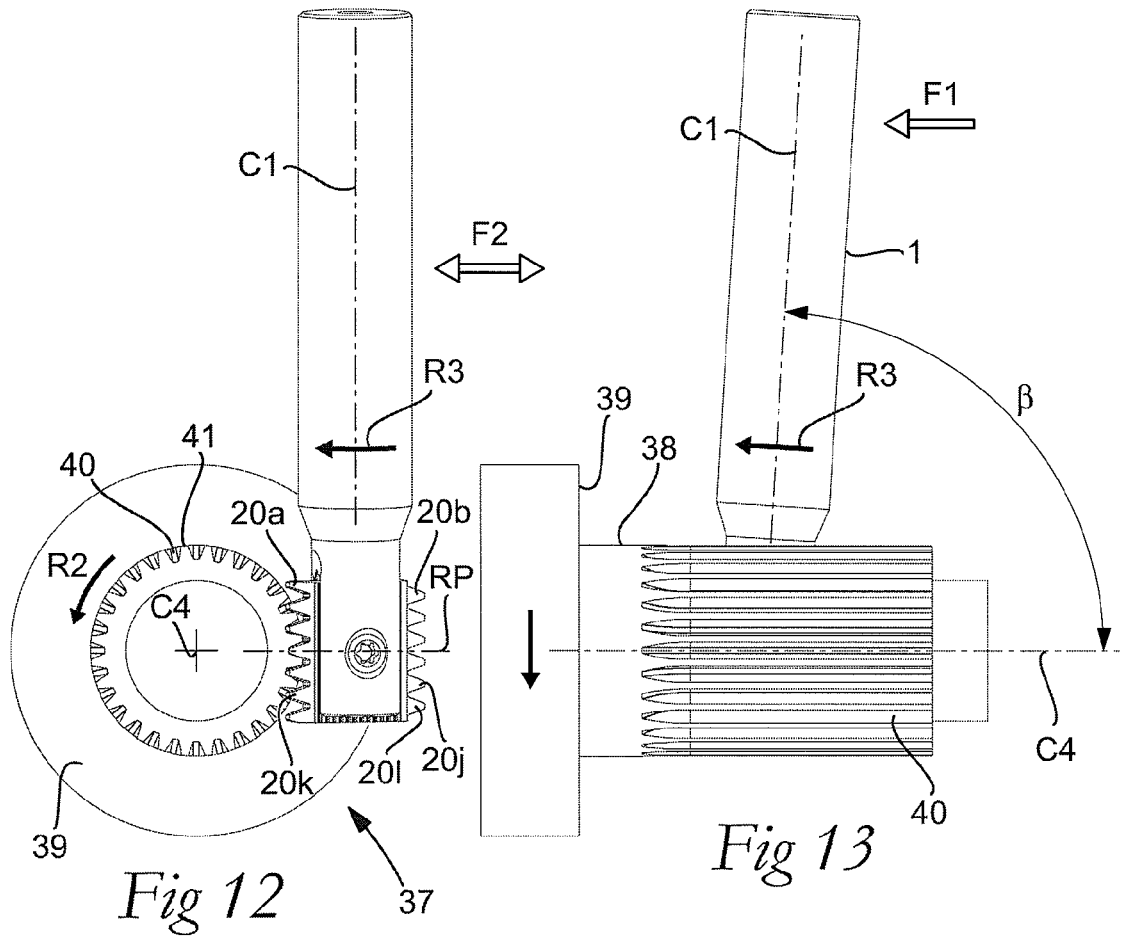
Fig 12
Fig 13
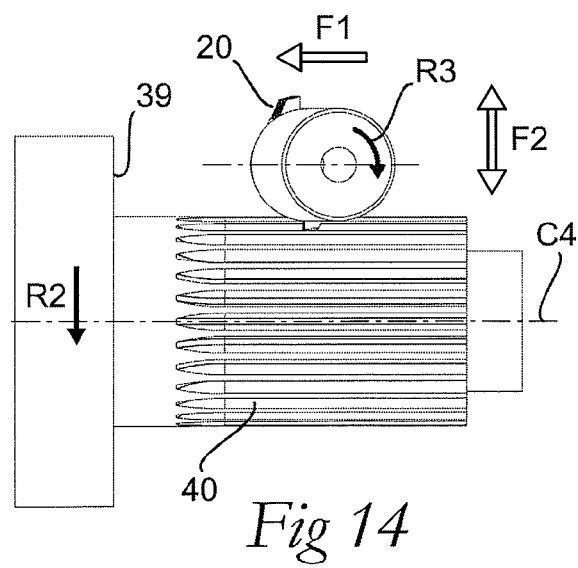
Fig 14

MILLING CUTTER TOOL FOR CHIP REMOVING MACHINING, AS WELL AS A CUTTING BODY THEREFOR

This application claims priority under 35 U.S.C. §119 to Swedish Patent Application No. 0702868-1, filed on Dec. 21, 2007, which is incorporated by reference herein in its entirety.

FIELD OF THE INVENTION

In a first aspect, the present invention relates generally to a milling cutter tool for cutting or chip removing machining of the type that includes, on one hand, a basic body having an envelope surface and two opposite ends between which a geometrical center axis extends around which the basic body is rotatable, and, on the other hand, a cutting body fixed in a seating in the basic body and having a pair of opposite main surfaces, a pair of opposite side surfaces and a pair of opposite end surfaces between which an imaginary, axial neutral plane extends situated halfway between the two main surfaces, the cutting body including a set of chip removing teeth, which protrude from the envelope surface of the basic body; are arranged in a row one after the other along a side surface of the cutting body; and individually include a chip surface formed adjacent to a cutting edge, from which the tooth extends between a pair of flanks and has a certain length extension, which is orientated at an angle to the neutral plane. In an additional aspect, the invention also relates generally to a cutting body for the tool in question.

BACKGROUND OF THE INVENTION

Before the invention is described in detail, it should be mentioned that the technique for chip removing machining of, above all, workpieces of metal is quickly developing. When blanks or workpieces were previously machined to finished products having some complexity, such as engine components, vehicle and craft components, machine parts, etc., the manufacture was carried out in a plurality of steps or stations, which individually required separate set-ups of one and the same blank. For instance, a first machining could be one or more turning operations. If the detail also required different forms of recesses, such as key grooves or bar grooves, the same was moved to a new set-up of another station, where milling followed. Should the same in addition be provided with different forms of holes or ducts, transfer was carried out to an additional set-up of a drilling machine or drilling station. More recent, machines were developed in which a magazine is included having a large number of tools, each one of which can be picked out of the magazine and brought to an active state for machining, and which after accomplishing the machining is brought back to the magazine to be replaced by another tool.

In order to make the manufacture more effective and reduce the time for, as well as the cost of, the machining, universal machines have recently been developed in the form of so-called MultiTask machines, in which a large number of program-controlled tools are included, which are flexibly movable in space and capable of executing multiple machining operations, such as turning, milling, drilling, grinding, etc., without the workpiece having to be removed from the machine or the set-up thereof in the same, and in which the need for time-consuming tool exchanges is reduced to a minimum. In such universal machines, partly new requirements are made on the tools in question, not only in respect of their capacity to execute conventional as well as new machining operations, but also in respect of the accessibility of the tools so far that the individual tools should be able to move in complicated paths of motion within a limited space and in spite of this be able to come into contact with those parts of the blank being machined which are difficult to access. This applies not at least to milling cutter tools, e.g., of the type that is used for the milling of notches of different types.

A previously known milling cutter tool is described in SE 0400384-4 (publication number 526.644). This known tool includes a cutting body, which has two diametrically opposed sets of teeth, which are orientated perpendicularly to the neutral plane of the cutting body, and situated in pairs right in front of each other. This means that each pair of teeth will operate in one and the same notch in the form of a straight notch, the two teeth of the pair going alternately in engagement with the workpiece after each half a revolution of rotation of the tool. This tool is useful for a plurality of different milling operations, but not for gear hobbing.

The present invention aims at obviating the above-mentioned shortcoming of the previously known milling cutter tool and at providing a milling cutter tool and a cutting body associated therewith, which are suitable for gear hobbing, in particular in MultiTask machines.

An object of the invention to provide a milling cutter tool, the cutting body of which is designed in such a way that the tool can, by simple feeding motions, be utilized for gear hobbing, in particular for the creation of bar grooves or splines in shafts or shaft spigots having a rotationally symmetrical, usually cylindrical shape.

Another object of the invention is to provide a tool having great accessibility so far that it should be possible to feed the tool by simple geometrical motions and to bring the tool quite close to shoulders and the like, in particular in order to optimize the length of milled bar grooves. In addition it should be possible to utilize the cutting body of the tool for up milling as well as down milling.

SUMMARY OF THE INVENTION

The invention is based on the idea of inclining the teeth of the individual set of teeth of the cutting body at an acute angle to the neutral plane of the cutting body. In its preferred embodiment, the cutting body is formed with two diametrically opposed sets of teeth, the teeth of one of the sets being axially displaced half a tooth width in relation to the teeth of the other set, besides which the teeth are uniformly inclined in each one of the sets.

In an embodiment, the invention provides a milling cutter tool, including a basic body and a cutting body. The basic body includes an envelope surface and two opposite ends between which a geometrical center axis extends around which the basic body is rotated. The cutting body is fixed in a seating of the basic body and includes a pair of opposite main surfaces, a pair of opposite sides, and a pair of opposite end surfaces between which an imaginary, axial neutral plane extends situated halfway between the two main surfaces. The cutting body includes a set of chip removing teeth, which protrude from the envelope surface of the basic body, and are arranged in a row one after the other along at least one of the pair of opposite sides of the cutting body. Each one of the teeth includes a chip surface formed adjacent to a cutting edge from which the tooth extends between a pair of flanks along a length extension which is orientated at an angle ($\beta$) to the neutral plane. The angle ($\beta$) between the neutral plane of the cutting body and the length extension of each of the teeth is acute and amounts to at least 85°.

In another embodiment, the invention provides a cutting body for a milling cutter tool, including a pair of opposite main surfaces, a pair of opposite sides, and a pair of opposite end surfaces between which an imaginary, axial neutral plane extends situated halfway between the two main surfaces. A set of teeth are arranged in a row one after the other along at least one of the pair of opposite sides. Each of the teeth includes a chip surface formed adjacent to a cutting edge from which the tooth extends between a pair of flanks along a length extension which is orientated at an angle (β) to the neutral plane. The angle (β) between the neutral plane and the length extension of each of the teeth is acute and amounts to at least 85°.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 12 is an end view of a rotatable workpiece in the form of a shaft spigot during machining by the milling cutter tool according to an embodiment of the invention;

FIG. 13 is a side view showing the same workpiece from the side; and

FIG. 14 is a planar view from above of the workpiece as well as the milling cutter tool.

DETAILED DESCRIPTION OF THE PREFERRED EMBODIMENTS

Figure 1:
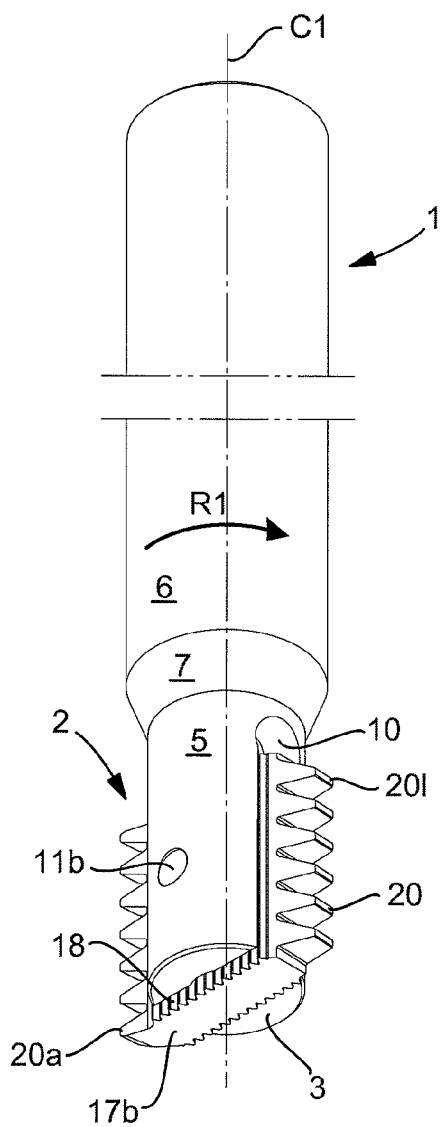
FIG. 1 is a perspective view of a milling cutter tool according to an embodiment of the invention.
Figure 2:
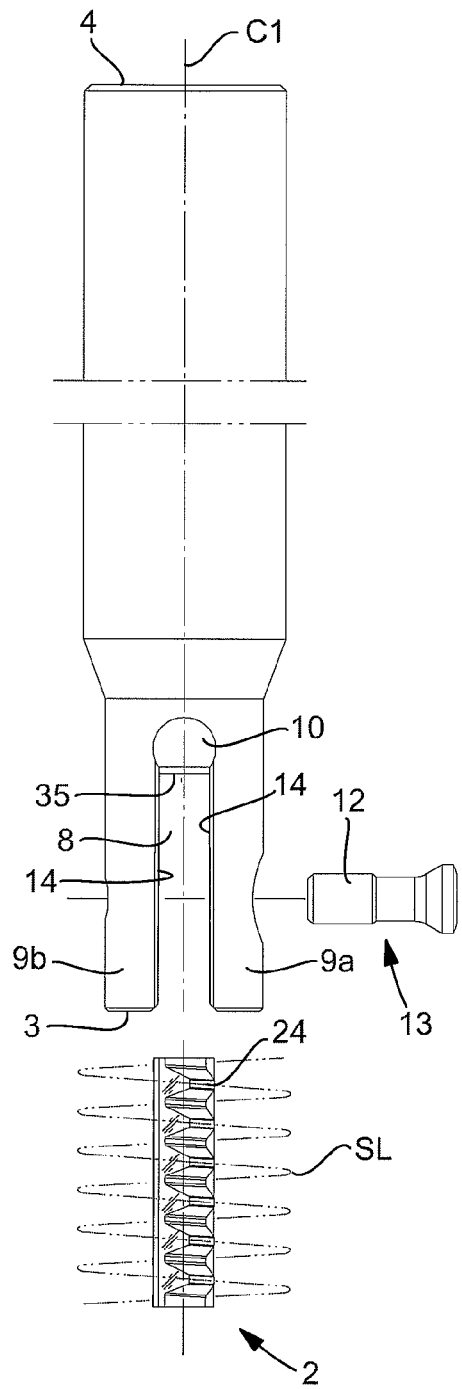
FIG. 2 is a side view of the same tool, the cutting body of the tool being shown spaced-apart from the basic body thereof.

The milling cutter tool shown in FIGS. 1 and 2 includes a basic body 1 and a replaceable cutting body 2 of a material being harder and more wear-resistant than the material of the basic body. Advantageously, the basic body may be manufactured from steel and the cutting body from cemented carbide. The basic body 1 includes two opposite ends 3, 4, between which a geometrical center axis C1 extends around which the basic body is rotatable, in this case in the direction of rotation R1. Apart from by the ends 3, 4, the basic body is delimited by two cylindrical envelope surfaces 5, 6, which are spaced-apart from each other via a conical surface 7. The cutting body 2 is mounted in a seating 8, which, in the embodiment shown, is in the form of a slit, which is delimited between the insides of two deflectable branches 9a, 9b and ends in a transverse hole 10, the diameter of which is greater than the width of the slit 8. In the two branches 9a, 9b, through holes 11a, 11b are drilled (see also FIG. 11), one of which, viz. the hole 11b, is formed with a female thread for engagement with a male thread 12 of a screw 13 by which the branches 9a, 9b can be deflected inwardly toward each other. In the insides of the two branches, conventional serrations 14 are formed (see also FIG. 9) in the form of a plurality of long narrow, parallel ridges, having a wedge-like or V-like cross-sectional shape, and being spaced-apart by grooves. The ridges and grooves run axially, i.e., parallel to the center axis C1.

Reference is now made to FIGS. 3-9, which illustrate the design of the cutting body 2. In the example shown, the cutting body has the shape of a hexahedron having a pair of opposite main surfaces 15a, 15b, a pair of opposite side surfaces or sides 16a, 16b, and a pair of opposite end surfaces 17a, 17b, between which an imaginary, axial neutral plane NP extends and is situated halfway between the two main surfaces 15a, 15b. The two main surfaces 15a, 15b are mutually parallel and each one is formed with a second set of serrations 18 in the form of cross-sectionally V-shaped ridges and grooves intended to co-operate with the grooves and the ridges, respectively, in the first serrations 14 of the basic body 1. Along the two sides 16a, 16b, sets of cutting teeth are formed, which will be described in more detail below. The two end surfaces 17a, 17b are plane and orientated perpendicularly to the main surfaces as well as the two sides. A center axis C2 contained in the neutral plane NP is located halfway between the sides 16a, 16b and extends axially between the end surfaces 17a, 17b.

In the two main surfaces 15a, 15b, a through hole 19 mouths, the center axis C3 of which extends perpendicularly to the neutral plane NP.

As previously mentioned, the prior art tool is formed with a cutting body, the teeth of which extend perpendicularly to the neutral plane of the cutting body; something which makes it impossible to use the tool for gear hobbing.

Figure 4:
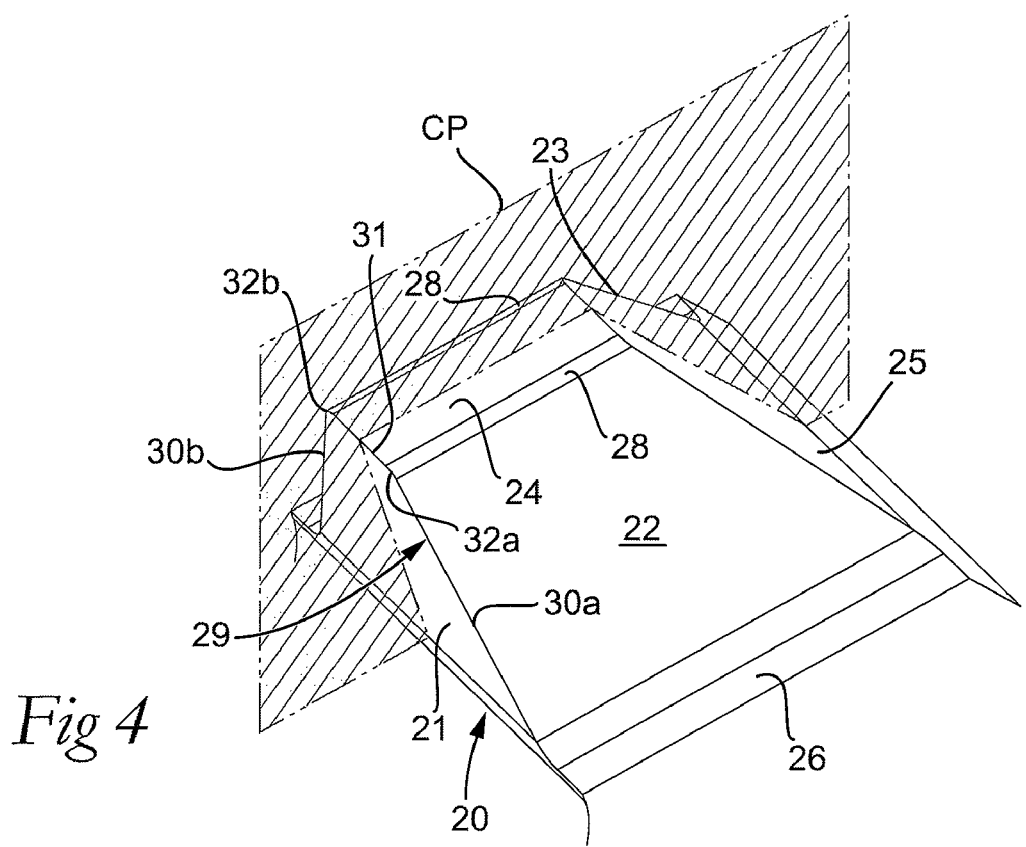
FIG. 4 is an additional enlarged perspective view of an individual tooth included in the cutting body.

The individual teeth of the two sets of teeth of the cutting body 2 according to the embodiment are identical in respect of the cutting geometries thereof. As illustrated in FIG. 4, an individual tooth 20 includes a chip surface 21, two flanks 22, 23, a back surface 24 as well as an end surface 25. As viewed in the direction of motion of the tooth during rotation, the chip surface 21 forms a front surface and the end surface 25 a rear surface. To the flanks 22, 23, surfaces 26 connect, which form bottoms of gaps 27 (see FIG. 5), which separate the teeth. Between the back surface 24 and the flanks 22, 23, there are arched transition surfaces 28 in the form of so-called radius transitions.

Along the chip surface 21, a cutting edge, in its entirety designated 29, extends, which includes a plurality of part edges, viz. two flank edges 30a, 30b, to which the flanks 22, 23 are connected, a back edge 31 to which the back surface 24 is connected, as well as two arched corner edges 32a, 32b adjacent to the transition surfaces 28. Halfway between the flanks 22, 23, which in the example are plane and run parallel to each other, an imaginary central plane CP extends, which defines the length extension of the tooth.

Figure 9:
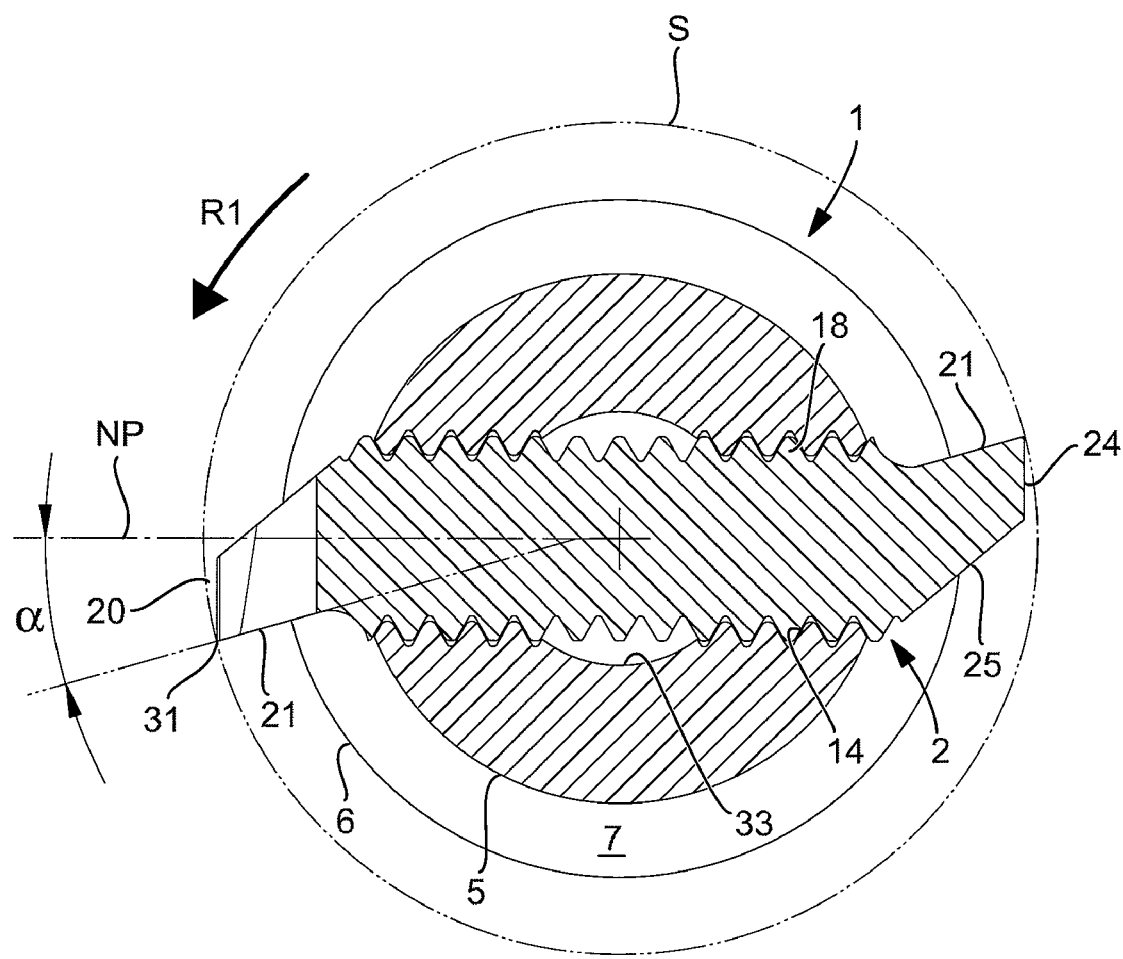
FIG. 9 is an enlarged cross-section through the tool in the area of the cutting body.

In FIG. 9 it is seen that the individual tooth 20 has a positive cutting geometry so far that the chip surface 21 is tipped forward at an angle α in relation to the neutral plane NP of the cutting body. This angle α may vary, but amounts in the example to 15°. Furthermore, the back surfaces and the end surfaces 24, 25 of the individual tooth are relieved or inclined so far that they, in their entirety, are inside the imaginary circle S, which the back edge 31 of the tooth describes during the rotation of the tool. In other words, the surfaces 24, 25 clear from those surfaces, which are generated in the workpiece.

Figures 5, 6, 7:
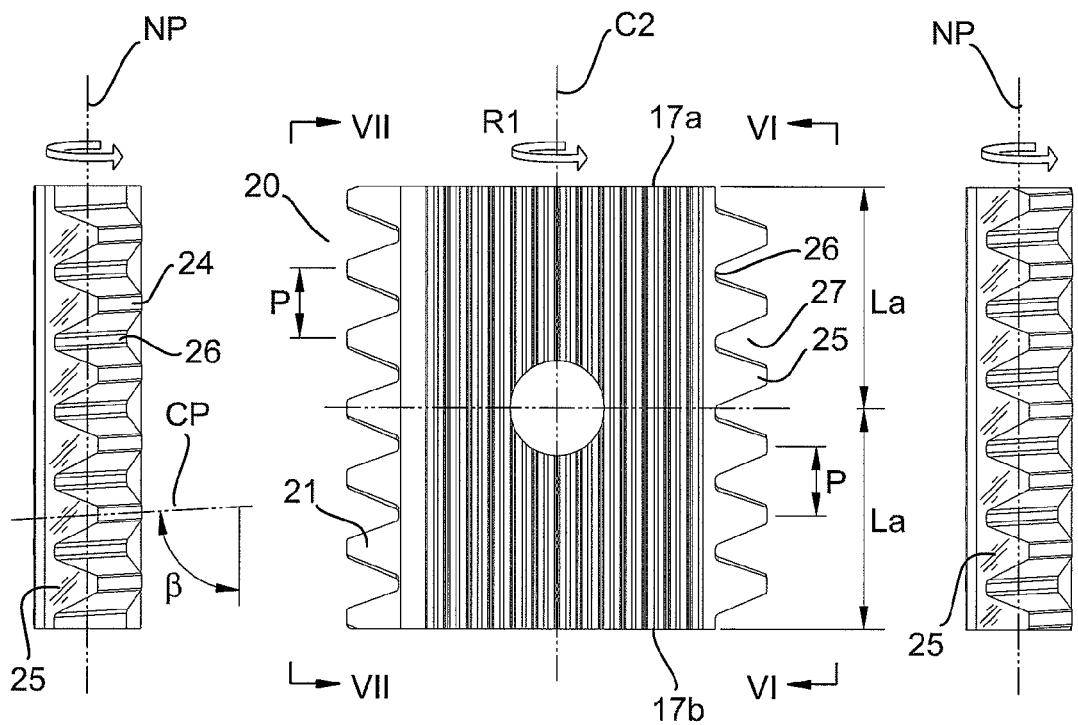
FIG. 5 is a planar view of the cutting body.
FIG. 6 is a side view VI-VI in FIG. 5.
FIG. 7 is a side view VII-VII in FIG. 5.
Figure 8:
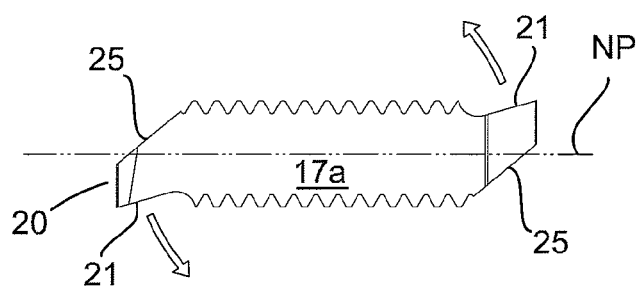
FIG. 8 is an end view of the cutting body, as viewed from above in FIG. 5.

FIG. 6 shows how the length extension of the individual tooth 20, as represented by the central plane CP, is inclined at an acute angle β in relation to the neutral plane NP of the cutting body. In the example shown, the angle β amounts to 86.7° (86° 42'). Furthermore, it should be noted that the partition P between the teeth is equally great in the two sets of teeth.

In the shown, preferred embodiment, in which the cutting body includes two diametrically opposed sets of teeth, the teeth of one of the sets are axially displaced half a tooth width in relation to the teeth of the other set so far that the center plane CP for the individual tooth in one of the sets of teeth is situated halfway between the center planes of a pair of opposite teeth of the second set of teeth. This means that the teeth of one of the sets are located opposite the teeth gaps of the other set, and vice versa. It should also be noted that the number of teeth in one of the sets is odd, while the number of teeth of the other set is even. From FIG. 3, where the different teeth have been provided with individual reference designations, it is accordingly evident that one set of teeth includes seven teeth 20a, 20c, 20e, 20g, 20i, 20k and 20m, while the other set includes six teeth 20b, 20d, 20f, 20h, 20j and 20l. All of these teeth, except the outermost teeth 20a, 20m of one of the sets, are fully sized. The middle tooth 20g of the left set of teeth is situated flush with the hole 19, i.e., in a plane halfway between the end surfaces 17a, 17b of the cutting body. It should also be observed that the partition between the teeth is designated P in FIG. 5.

By the fact that the teeth are inclined in relation to the neutral plane of the cutting body, as well as axially displaced in relation to each other in the way described above, the back surfaces 24 (or central planes CP) of the teeth will be tangent to an imaginary helical line SL of the type shown in FIG. 2. This imaginary helical line SL is concentric with the center axis C2 of the cutting body and has a pitch, which corresponds to the partition P between adjacent teeth of one and the same set of teeth.

Figure 10:
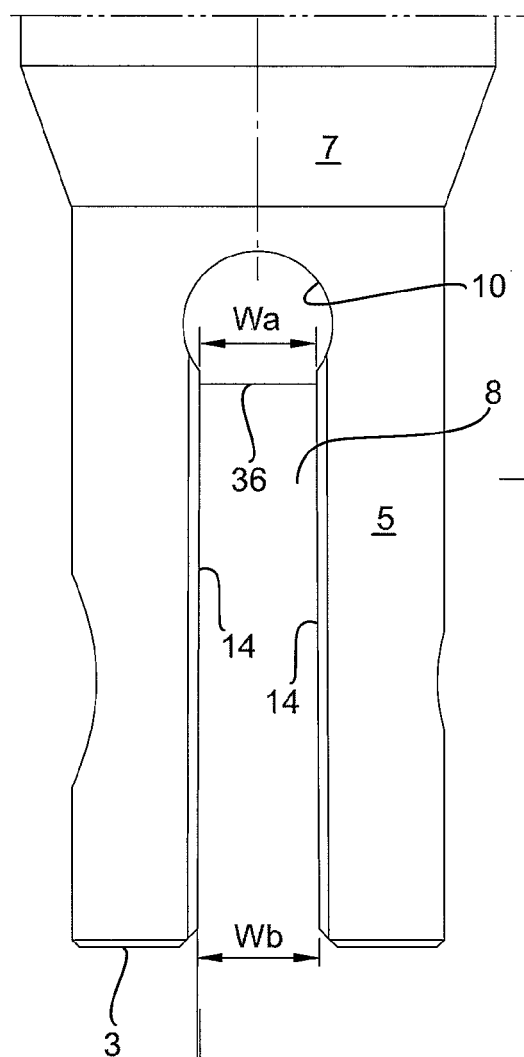
FIG. 10 is an enlarged side view showing an end portion of the basic body of the tool.
Figure 11:
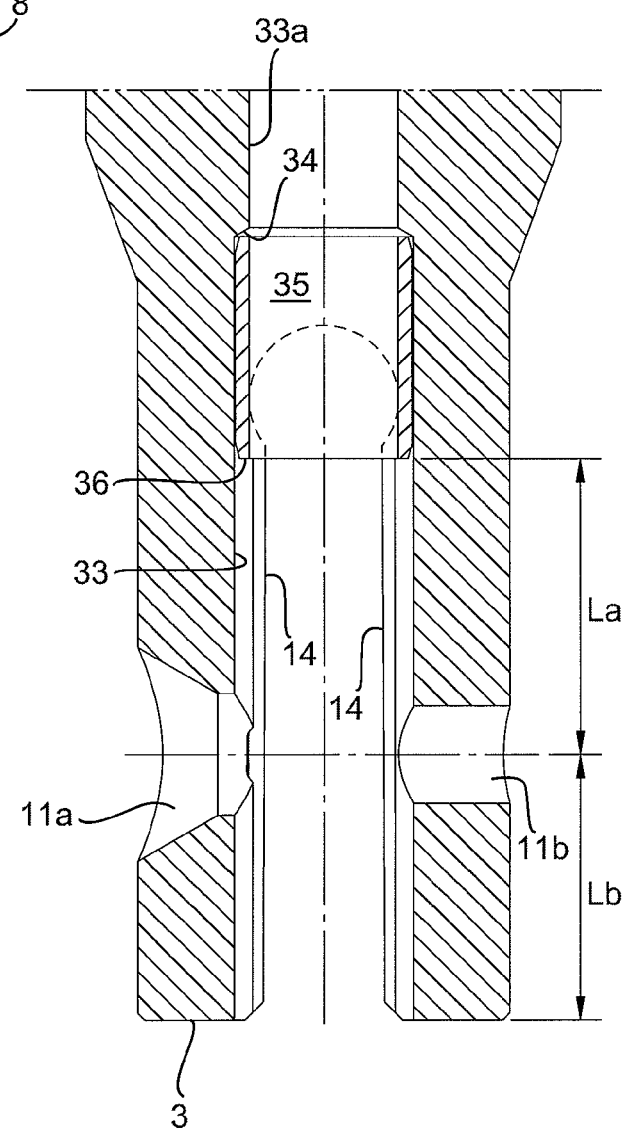
FIG. 11 is a longitudinal section through the same end portion.

Reference is now made to FIGS. 9-11, which illustrate the attachment of the cutting body 2 to the basic body 1. As is seen in FIG. 9, a central, axial hole 33 is drilled in the basic body 1, the diameter of which is approximately half as large as the diameter of the basic body in the area of the envelope surface 5. The inner end of hole 33 (see FIG. 11) transforms into a more slender hole 33a via a shoulder 34, against which a stopping element 35 is pressed. More precisely, this stopping element is in the form of a pipe piece, one ring-shaped end surface of which is pressed against the shoulder 34, while the other end surface 36 forms a stop surface for the cutting body 2. The distance La between the stop surface 36 and the common center axis C4 of the holes 11a, 11b is as great as the distance La between the center hole 19 of the cutting body 2 and each one of the two end surfaces 17a, 17b of the cutting body (see FIG. 5). However, the distance Lb between the holes 11a, 11b and the free end surface 3 of the basic body is smaller than La, and therefore the cutting body will protrude axially a short distance from the basic body.

In the shown, preferred embodiment, the slit 8 diverges toward the free, front end 3 of the basic body so far that the width Wa in the interior of the slit is somewhat smaller than the width Wb at the free end, when the branches are in a tension-free state (before mounting of the cutting body). The difference between Wa and Wb may in practice amount to some tenth of a mm, involving that the angle of divergence γ becomes very moderate, e.g., within the range of 0.1-0.3°. With this limited angle of divergence, the insertion of the cutting body into the slit 8 is significantly facilitated.

In order to avoid the risk of lateral incorrect mounting of the cutting body, particular measures can be taken. In the example shown, the holes 11b and 19 as well as the male thread 12 of the screw 13 have approximately an equally large diameter, which means that the screw cannot be brought through the hole 19 of the cutting body if this is incorrectly mounted. In order to ensure this effect, the hole 19 of the cutting body should have an inner diameter, which is at least as great as the outer diameter of the screw without, however, exceeding the same by more than the distance between adjacent ridges of the serrations 14, 18.

Another way of ensuring a foolproof mounting of the cutting body is to form at least one ridge in one of the serrations and a co-operating groove in the other having a width, which deviates from the width of other ridges and grooves, respectively.

When the cutting body has been brought into the slit 8, the same is secured by the screw 13, which upon tightening deflects the elastically resilient branches 9a, 9b inwardly toward each other during clamping of the cutting body. In this state, the cutting body is kept stably fixed in position by the fact that the different ridges are wedged up in co-operating grooves (however without the ridges bottoming in the grooves) and makes lateral displacement of the cutting body impossible, the axial position of the cutting body being determined in an exact way by the stopping element 35. In this position, the cutting body can neither move axially nor radially in relation to the basic body.

Before the function of the tool is described in more detail, it should be mentioned that the angle of inclination β of the teeth 20 may vary upward as well as downward from the exemplified value of 86.7°. However, in any event, β should amount to at least 85°, suitably at least 86°. On the other hand, β should not be more than 89.5°. Advantageously, β may be within the interval of 86-88°.

It should also be noted that the cutting body 2 is mounted for rotation to the right and for up milling in the example according to FIGS. 1 and 2, i.e., so that the released chips are thrown forward in the direction that the tool should be linearly fed.

In order to illustrate the function of the tool, reference is made to FIGS. 12-14, in which a workpiece 37 is shown, in which a shaft spigot 38, as well as a shoulder 39, from which the shaft spigot protrudes, are included. In practice, the workpiece may be machined to a shaft, e.g., a driving shaft, or a crankshaft. In the example, the purpose of the tool is to mill notches 40 in the shaft spigot 38 in order to form bars 41 of a so-called spline coupling by which the finish-machined shaft can be coupled to a driving source. In this case, the number of bars and bar grooves amounts to 28. For the sake of simplicity, these notches are shown in a finish-machined state, i.e., with full length, in FIGS. 13 and 14.

In the example, the workpiece 37 is set-up in an axially immovable state, in which the same can be rotated only, more precisely in the direction of rotation R2 around the center axis C5 of the workpiece.

In the following description, such concepts as "vertical", "horizontal", "upper" and "lower", respectively, will be used, which, however, only relate to the drawing FIGS. 12-14. In other words, the workpiece as well as the tool may be arbitrarily placed in the space provided that the same mutually assume those positions, which are shown in the figures.

In FIG. 12, a reference plane RP is shown, which extends horizontally from the center axis C5 of the workpiece toward the tool. When an arbitrary point on the periphery of the shaft spigot 38 during the rotation of the workpiece passes the reference plane RP, the same is situated at the shortest possible distance from the tool.

In a coordinate direction (see FIG. 13), the basic body 1 of the tool is inclined in relation to the vertical plane, viz. at the same angle β as the teeth of the cutting body 2 are inclined in relation to the neutral plane of the cutting body (see FIG. 6). As viewed in FIG. 12, the center axis C1 of the basic body is, however, located in the vertical plane.

Figure 3:
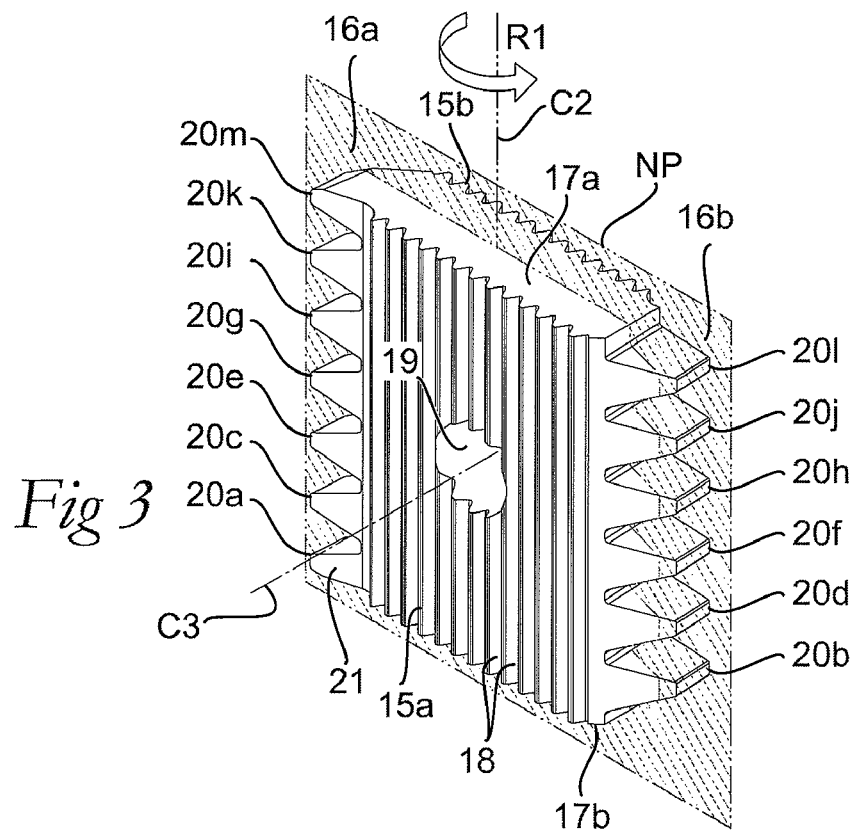
FIG. 3 is an enlarged perspective view of the proper cutting body only.

In order to elucidate a special advantage of the tool according to the embodiment, viz. that the same can be used for rotation to the right as well as rotation to the left, the cutting body in FIGS. 12-14 is shown inverted 180° so that, for instance, the tooth 20l now is at the very front instead of at the very back according to FIGS. 1-3. Simultaneously, the tool is shown with a reversed direction of rotation R3. As viewed in the horizontal plane, the tool is linearly movable in the direction of the single-arrow F1. In other words, the tool should be longitudinally fed in the direction from the right toward the left in FIG. 13. In addition, the tool is adjustably movable in the direction of the double-arrow F2 so as to make it possible to bring the same into and out of engagement with the workpiece. It is also worth pointing out that all teeth 20 of the cutting body 2 rotate in such a way that the chip surface 21 (see FIG. 4) and certain ones of the connecting the part edges will meet the workpiece in an arbitrary co-ordinate point before other surfaces, such as the flanks 22, 23 and the back surface 24, reach up to the same point. In doing so, the last-mentioned surfaces clear from the surfaces of the workpiece generated by the part edges. The removed chips will in this case be thrown out forwardly in relation to the feeding direction F1 (i.e. up milling).

The milling operation in question, which is a so-called gear hobbing, is based on a careful adjustment and synchronization of the speeds of rotation of the tool and of the workpiece, as well as the linear feed speed (F1) of the tool. Generally, the speed of rotation of the tool should be so much greater than the speed of rotation of the workpiece as the number of desired bar grooves. If the number of bar grooves, as mentioned, amounts to 28, the speed of rotation of the tool should be 28 times greater than the speed of rotation of the workpiece. Furthermore, it may be said that the longitudinal feed (F1) of the tool is moderate like the speed of rotation of the workpiece.

When an arbitrary point along the envelope surface of the shaft spigot 38 during the rotation of the workpiece in the direction of the arrow R2 (upon entering or later during the machining) approaches the rotating cutting body 2, the same will first be impinged on by a tooth situated low in either one of the sets of teeth, e.g., the tooth 20k in the set having an odd number of teeth, as shown in FIG. 12 (cf. FIG. 3). In doing so, the tooth will remove a thin and superficially situated chip, more precisely by the corner edge 32b positioned at the top (see FIG. 4) of the tooth as well as parts of the adjacent part edges 30b, 31. Then, the tooth clears from the workpiece. When this has rotated additionally 7.2° (360°/28×2), the tool has simultaneously rotated half a revolution (during limited longitudinal feed F1), the initiated notch in the point being impinged on by the trailing tooth 20j of the opposite set of teeth. In doing so, this tooth 20j will remove an additional chip, which is wider than the first one removed, because the upper corner edge 32b of the tooth as well as connecting portions of the part edges 30b, 31 now dig themselves deeper into the workpiece. After an additional 7.2° of rotation of the workpiece and 180° of rotation of the tool, the next tooth 20i of the first-mentioned set of teeth is brought into engagement with the workpiece and removes a chip, which is even somewhat wider than the first chips. These part operations are repeated until the rotating point of the envelope surface of the shaft spigot reaches the reference plane RP.

Here, it should be observed that the machining of the initiated bar groove first exclusively takes place by the upper parts of those teeth, which are situated under the reference plane RP, while the other part of the cutting edge 29, i.e., the lower half of the part edge 31, the corner edge 32a and the flank edge 30a, has no contact with the workpiece.

When the initiated bar groove during the rotation thereof in the direction of the arrow R2 has passed the reference plane RP, the above-mentioned phenomenon is reversed so far that only the lower parts 31, 32a, 30a of the cutting edges 29 of the teeth cut into the workpiece, while the upper parts 30b, 32b and the upper half of the part edge 31 clear from the workpiece.

By adapting in a suitable way the longitudinal feed speed F1 of the tool in relation to the rotation R2 of the workpiece, the machining of each initiated bar groove will, after one revolution of rotation of the workpiece, commence exactly where the machining during the preceding revolution was concluded. By the fact that the teeth of the cutting body as well as the tool in its entirety are inclined at the angle β in the way described above, the flank edges 30a, 30b of the teeth will generate surfaces, which run parallel to the center axis C4 of the workpiece in spite of the workpiece being rotated at the same time as the tool is longitudinally fed and rotated. Therefore, the diminutive part surfaces, which are generated during each tooth engagement, will together form continuous, long narrow surfaces in the form of bar flanks, which run parallel to the center axis of the workpiece.

In this connection, it should be pointed out that the speed by which milling of, for instance, a spline coupling can be carried out, is in practice limited by a plurality of factors, such as the risk of vibrations, desired surface smoothness, available machine equipment, etc. Even if the forming of a spline coupling could take one or a few minutes, the invention, however, affords the fundamental advantage that a rotating workpiece, e.g., a workpiece which in other respects calls for turning only, can be made with straight, axially running notches of the described kind. It is even possible to carry out the milling operation at the same time as the workpiece is machined in another way. Another significant advantage is clearly seen in FIG. 14, which illustrates how the tool, due to the limited diameter thereof, can be brought very close to the shoulder 39. In such a way, it is ensured that the bar grooves 40 can be given an optimum length along the available envelope surface of the shaft spigot 38. In addition, rotation to the right as well as rotation to the left is enabled by the simple measure of only inverting the cutting body 180°. In such a way, the operator can choose between up milling or down milling independently of the location and the longitudinal feed direction, respectively, of the tool in relation to the workpiece.

Within the scope of the invention, it is possible to modify the tool in various ways. Thus, it is possible to design the cutting body of the tool with only one set of teeth, although two are preferred in practice. Furthermore, the basic shape of the cutting body may be other than hexagonal. For instance, the cutting body may be octagonal and formed with two pairs of diametrically opposed sets of teeth. Furthermore, it is possible to form the basic body of the tool so that the same can be equipped with two or more cutting bodies, wherein the seatings for the same may be placed in other ways than in the front end of the basic body, provided that the teeth of the basic bodies will be mutually tangent to a helical line in the previously described way. In addition, the design of the individual cutting tooth may be varied, e.g., by the flanks of the tooth being brought to converge in the backward direction in order to give a better clearance. Also, the chip surface of the tooth does not need to run at an exact 90° angle to the longitudinal axis or center plane of the tooth.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A milling cutter tool comprising:
a basic body having an envelope surface and two opposite ends between which a geometrical center axis extends around which the basic body is rotated; and
a cutting body fixed in a seating of the basic body and having a pair of opposite main surfaces, a pair of opposite sides, and a pair of opposite end surfaces between which an imaginary, axial neutral plane extends situated halfway between the two main surfaces;
the seating of the basic body for the cutting body being a slit which is delimited between insides of two spaced-apart, deflectable branches, and opens in one of the two ends of the basic body, the insides of the branches being deflected onto respective opposite main surfaces of the cutting body;
the cutting body including a set of chip removing teeth, which protrude from the envelope surface of the basic body, and are arranged in a row one after the other along at least one of the pair of opposite sides of the cutting body;
each one of the teeth including a chip surface formed adjacent to a cutting edge from which the tooth extends between a pair of flanks along a length extension which is orientated at an angle ($\beta$) to the neutral plane,
wherein the angle ($\beta$) between the neutral plane of the cutting body and the length extension of each of the teeth is acute and amounts to at least 85°.

2. The milling cutter tool according to claim 1, wherein the angle ($\beta$) amounts to at most 89.5°.

3. A milling cutter tool comprising:
a basic body having an envelope surface and two opposite ends between which a geometrical center axis extends around which the basic body is rotated; and
a cutting body fixed in a seating of the basic body and having a pair of opposite main surfaces, a pair of opposite sides, and a pair of opposite end surfaces between which an imaginary, axial neutral plane extends situated halfway between the two main surfaces;
the cutting body including a set of chip removing teeth along each one of the pair of opposite sides which protrude from the envelope surface of the basic body and are arranged in a row one after the other, wherein the teeth of one of the sets are axially displaced half a tooth width in relation to the teeth of the other set;
each one of the teeth including a chip surface formed adjacent to a cutting edge from which the tooth extends between a pair of flanks along a length extension which is orientated at an angle ($\beta$) to the neutral plane,
wherein the angle ($\beta$) between the neutral plane of the cutting body and the length extension of each of the teeth is acute and amounts to at least 85°.

4. The milling cutter tool according to claim 3, wherein the number of teeth of one of the sets is odd and the number of teeth of the other set is even.

5. A milling cutter tool comprising:
a basic body having an envelope surface and two opposite ends between which a geometrical center axis extends around which the basic body is rotated; and
a cutting body fixed in a seating of the basic body and having a pair of opposite main surfaces, a pair of opposite sides, and a pair of opposite end surfaces between which an imaginary, axial neutral plane extends situated halfway between the two main surfaces;
the cutting body including a set of chip removing teeth, which protrude from the envelope surface of the basic body, and are arranged in a row one after the other along at least one of the pair of opposite sides of the cutting body;
each one of the teeth including a chip surface formed adjacent to a cutting edge from which the tooth extends between a pair of flanks along a length extension which is orientated at an angle ($\beta$) to the neutral plane, wherein the angle ($\beta$) between the neutral plane of the cutting body and the length extension of each of the teeth is acute and amounts to at least 85°;
the seating of the basic body for the cutting body being a slit which is delimited between insides of two spaced-apart, deflectable branches, and opens in one of the two ends of the basic body,
the cutting body being fixed by a screw, which is introduced in holes of the branches and runs through a through hole of the cutting body,
first serrations in the form of a plurality of long, narrow, parallel ridges and spaced-apart by grooves being formed in the insides of the branches, and second serrations in the form of a plurality of long, narrow, parallel ridges and spaced-apart by grooves are formed in the main surfaces of the cutting body, the ridges of the first serrations engaging the grooves of the second serrations, and vice versa, and
the through hole of the cutting body mouthing in each one of the main surfaces and being situated halfway between the side surfaces,
wherein the distances between the through hole and the two end surfaces of the cutting body are equally large.

6. The milling cutter tool according to claim 5, wherein in the slit between the branches of the basic body, a stopping element is received against which one end surface of the cutting body is pressed.

7. A cutting body for a milling cutter tool, comprising:
a pair of opposite main surfaces, a pair of opposite sides, and a pair of opposite end surfaces between which an imaginary, axial neutral plane extends situated halfway between the two main surfaces; and
a set of teeth, which are arranged in a row one after the other along each of the pair of opposite sides, each of the teeth including a chip surface formed adjacent to a cutting edge from which the tooth extends between a pair of flanks along a length extension which is orientated at an angle ($\beta$) to the neutral plane, wherein the angle (β) between the neutral plane and the length extension of each of the teeth is acute and amounts to at least 85°.

8. The cutting body according to claim 7, wherein the angle (β) amounts to at most 89.5°.

9. A cutting body for a milling cutter tool, comprising:

a pair of opposite main surfaces, a pair of opposite sides, and a pair of opposite end surfaces between which an imaginary, axial neutral plane extends situated halfway between the two main surfaces; and a set of teeth which are arranged in a row one after the other along each one of the pair of opposite sides, each of the teeth including a chip surface formed adjacent to a cutting edge from which the tooth extends between a pair of flanks along a length extension which is orientated at an angle (β) to the neutral plane, wherein the teeth of one of the sets are axially displaced half a tooth width in relation to the teeth of the other set, and wherein the angle (β) between the neutral plane and the length extension of each of the teeth is acute and amounts to at least 85°.

10. The cutting body according to claim 9, wherein the number of teeth of one of the sets is odd and the number of teeth of the other set is even.

11. The cutting body according to claim 7, comprising a through hole which mouths in each one of the main surfaces and is situated halfway between the sides, wherein the distances between the through hole and the two end surfaces are equally large.

\* \* \* \* \*